United States Patent Office 3,309,442
Patented Mar. 14, 1967

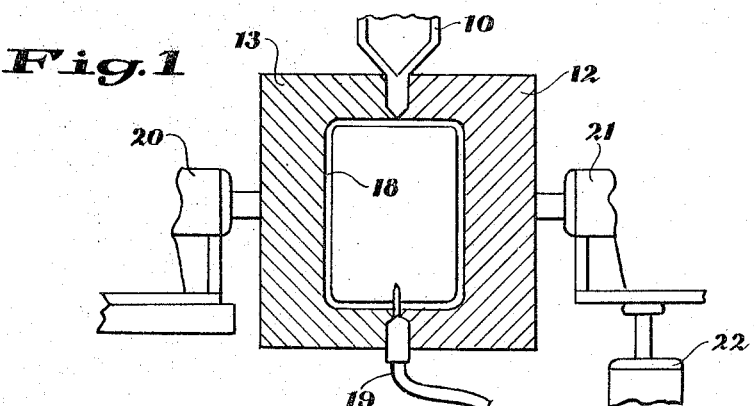
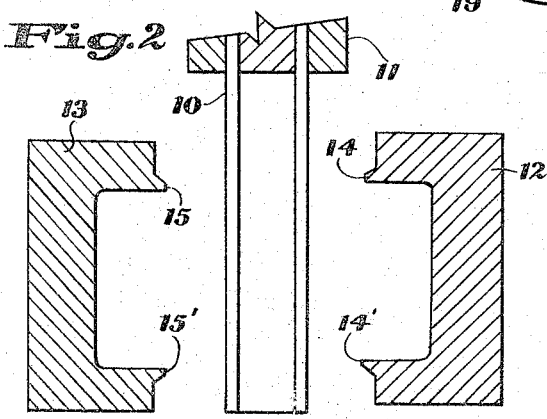
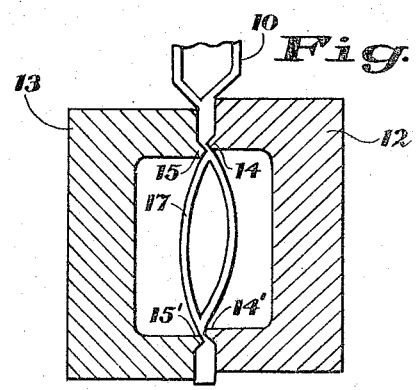
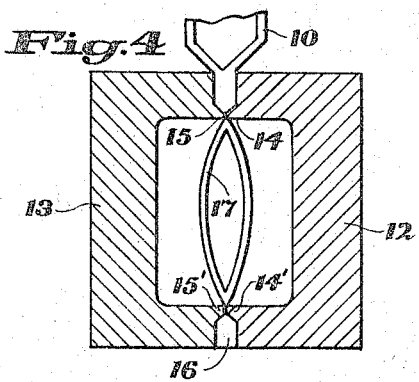
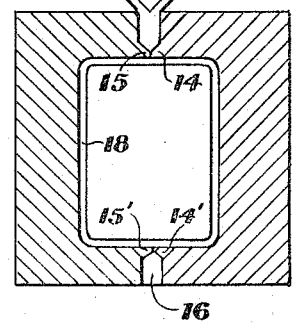
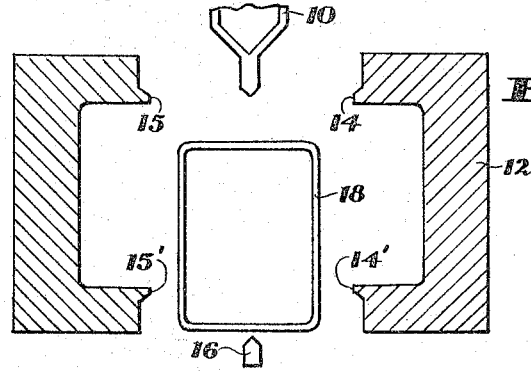

3,309,442
BLOW MOLDING PROCESS
Charles H. Stanley, Kingsport, Tenn., assignor to Eastman Kodak Company, Rochester, N.Y., a corporation of New Jersey
Filed July 17, 1963, Ser. No. 295,637
5 Claims. (Cl. 264—98)

This invention relates to a method for blow molding articles and more particularly to a method for severing an embryonic article from a supply source in such a manner as to avoid excess material or flash on the embryonic article.

Blow molding is a well-known method of producing containers or other hollow articles and initially involves extruding a softened plastic parison in, for instance, tubular form. The extruded parison is placed between a sectional mold which is closed to pinch and seal an embryonic article within the mold enclosure. Inflation means such as a hollow needle is inserted into the hollow embryonic article and the embryonic article is filled with a fluid substance under pressure. The fluid substance expands the embryonic article until it conforms accurately to the confines of the mold. After allowing the thus blown article to become rigid by cooling or other means, the sectional mold is opened and the molded article removed.

In another popular embodiment of blow molding, a blow pipe is inserted in the parison which is then pinched closed by the mold at the portion of the embryonic article opposite that where the blow pipe is inserted. Pressure is exerted by the closed mold to press the embryonic article against the blow pipe to form a gas-tight seal. A fluid substance is then passed into the embryonic article through the blow pipe to form a hollow article shaped in accordance with the mold cavity. Articles thus formed have open necks in the portion molded around the blow pipe.

Articles molded in the above-described manners usually require further finishing because of excess material or flash which remains between the mating surfaces of the mold when the sections are closed upon the parison. Flash on the articles when removed from the mold appears in the form of a ridge or appendage which projects from the article in an undesirable fashion and which must be subsequentially removed by grinding or other means.

The inconvenience and additional cost of removing flash from the blow molded articles can be avoided by cleanly shearing the embryonic articles from the parisons so that substantially no extruded material remains between the mating surfaces of the mold halves when they are closed. This accomplishes the two-fold purposes of precluding excess material which would form flash on the finished article and also allowing the mold halves to properly mate so no additional material will be forced between the mold halves during the blowing or inflation operation.

Attempts to provide means for cleanly severing a portion of the extruded supply material to form an embryonic article have been made. The more successful of these attempts require complex and troublesome mechanisms. The simpler approaches have yielded unsatisfactory results. For example, apparatus employing separate cutting surfaces which sever the extruded parison in an acceptable manner require extensive machinery to position the extruded parison and to move the cutting surface at an appropriate rate and time. On the other hand, the conventional apparatus using the surfaces of the mold sections to pinch and seal the extruded parison produce articles requiring further finishing.

It is an object of the present invention to provide a method of blow molding which obviates the need for subsequent removal of excess flash from a blow molded article.

Another object is to provide a method of blow molding which shears excess flash from the blown article during a fundamental and necessary step of the blowing process.

Other objects of the invention will be apparent from the following description and drawings.

According to the present invention, the embryonic article is sheared from the extruded parison by sliding the two halves of the mold relative to one another after closing the mold halves. The embryonic article is cut or sheared cleanly from the extruded parison by cooperating surfaces on the two mold halves.

The invention will be more fully understood with reference to the following drawings in which:

FIG. 1 is a sectional elevation showing one embodiment of the invention with means for closing and orienting the mold halves.

FIG. 2 is a sectional view showing the extruded parison between the mold halves.

FIG. 3 is a sectional view showing the mold halves in the initial closed position.

FIG. 4 is a sectional view showing the mold halves in the final closed position with the embryonic article enclosed within.

FIG. 5 is a sectional view showing the mold halves in the final closed position with the fully inflated article within.

FIG. 6 is a sectional view showing the position of the mold halves after completion of the molding operation.

In FIG. 1, mold halves 12 and 13 are secured to hydraulic cylinders 20 and 21 which enable the mold halves 12 and 13 to open and close relative to one another. Also, at least one of the mold halves 12 and 13 is movable in the direction in which parison 10 is extruded. In the illustrated embodiment, hydraulic cylinder 21 is mounted on hydraulic cylinder 22 in such a manner that mold half 12 may be moved relative to mold half 13 in the direction in which parison 10 is extruded.

As illustrated in FIG. 2, parison 10 is extruded in tubular form from nozzle 11 in the well-known manner. In the initial step of the molding operation, the heated pliable plastic parison 10 is positioned between mold halves 12 and 13. Mold halves 12 and 13 have cutting surfaces 14, 14' and 15, 15', respectively. Cooperating cutting surfaces 14, 15 and 14', 15' are initially misaligned so that when mold halves 12 and 13 are closed as in FIG. 3, the cutting surfaces define but do not necessarily detach embryonic article 17. However, when mold halves 12 and 13 are brought into proper register with cutting surfaces 14, 15 and 14', 15' aligned, embryonic article 17 is neatly and cleanly sheared from parison 10 and excess material 16 as illustrated in FIG. 4. Embryonic article 17 is sheared by the scissors-like action of cutting surfaces 14, 15 and 14', 15' as the mold halves are brought into proper and final alignment. Inflation means 19 such as that illustrated in FIG. 1 is then employed to inflate embryonic article 17 with a gas to form molded article 18 as shown in FIG. 5. The molded article 18 is allowed to remain in mold halves 12 and 13 under pressure until it cools sufficiently to maintain its shape. Thereupon, mold halves 12 and 13 are opened as shown in FIG. 6, and finished article 18 is removed free of flash without need for subsequent flash removal operations. The misalignment of mold halves 12 and 13 as shown in FIG. 3 does not affect the shape of the finished article 18 because the mold halves 12 and 13 are aligned as shown in FIG. 4 before the fluid substance is injected.

It may be advantageous to close mold halves 12 and 13 to the misaligned position under a force less than that used to close the mold halves during the inflation operation. Such reduced force would curtail wear and still provide excellent results since the relative movement of the mold halves is a more significant factor in the severing operation than the force applied to the mold halves.

It is to be understood that those skilled in the art will be able to employ many means of moving the mold halves relative to one another and it is envisioned that such means will include hydraulic, pneumatic, and mechanical devices, as well as associated electrical systems. Open-neck-article apparatus employing a blow pipe can also utilize the present invention to sever and seal the parison in a flash-free manner at the portion of the mold opposite that in which the blow pipe is inserted.

The invention has been described in detail with particular reference to preferred embodiments thereof, but it will be understood that variations and modifications can be effected within the spirit and scope of the invention as described hereinabove and as defined in the appended claims.

I claim:
1. A process for producing blow-molded hollow articles comprising extruding a parison of softened plastic material between an open mold having at least two complementary sections, closing the mold sections in a misaligned relationship, shearing an embryonic article from the parison by properly aligning the complementary mold sections, and expanding the embryonic article into a finished article by injecting a fluid substance therein.

2. In the process for producing blow-molded hollow articles as set forth in claim 1, the steps comprising closing the mold sections to an intermediate misaligned position, shearing an embryonic article from the parison by properly aligning the complementary mold sections, and completely closing the mold sections under forces sufficient to maintain the integrity of the seal between the mold sections during the expanding step.

3. A process for producing hollow articles from plastic material comprising extruding a configuration having an open cross section of plastic material in a state of plasticity into a space between the open sections of the sectional mold with the mating sections of the mold being misaligned in the direction of the extrusion, closing the section to the mold in a misaligned relationship, shearing a portion of the extruded material within a volume defined by the closed mold by moving at least one of the mold sections to bring the mold sections into proper alignment, filling the sheared section with a fluid substance to expand it into intimate contact with the mold confines, allowing the article to become sufficiently rigid to maintain its shape, and opening the mold sections to permit removal of the hollow article.

4. In the process of producing hollow articles by inflating an embryonic article within a closed section of mold, the step of shearing the embryonic article from an extruded parison by moving at least one of the mold sections relative to the other in a direction other than the direction employed to close the mold sections.

5. The process steps set forth in claim 4 wherein the direction in which the mold half is moved to shear the embryonic article is perpendicular to the direction employed to close the mold sections.

References Cited by the Examiner

UNITED STATES PATENTS 3,034,177  5/1962  Hooper _____ 18—305 XR
3,050,773  8/1962  Hagan _____ 264—98

ROBERT F. WHITE, *Primary Examiner.*

A. R. NOE, *Assistant Examiner.*